(12) United States Patent
Hosomi et al.

(10) Patent No.: US 8,905,184 B2
(45) Date of Patent: Dec. 9, 2014

(54) ELECTRIC POWER STEERING APPARATUS

(75) Inventors: Norio Hosomi, Yokohama (JP);
Tadakatsu Take, Ebina (JP); Junya Takekawa, Atsugi (JP); Ryouichi Suzuki, Yamato (JP); Shuta Togashi, Aikou-gun (JP)

(73) Assignee: JTEKT Corporation, Osaka-Shi (JP)

( * ) Notice: Subject to any disclaimer, the term of this patent is extended or adjusted under 35 U.S.C. 154(b) by 49 days.

(21) Appl. No.: 13/578,098

(22) PCT Filed: Feb. 22, 2011

(86) PCT No.: PCT/JP2011/053815
§ 371 (c)(1),
(2), (4) Date: Aug. 9, 2012

(87) PCT Pub. No.: WO2011/108398
PCT Pub. Date: Sep. 9, 2011

(65) Prior Publication Data
US 2012/0312626 A1     Dec. 13, 2012

(30) Foreign Application Priority Data

Mar. 1, 2010  (JP) ................ 2010-044166

(51) Int. Cl.
| | | |
|---|---|---|
| *B62D 5/04* | (2006.01) | |
| *B62D 1/189* | (2006.01) | |
| B62D 3/02 | (2006.01) | |
| B62D 1/18 | (2006.01) | |
| B62D 1/183 | (2006.01) | |
| B62D 1/187 | (2006.01) | |
| B62D 1/184 | (2006.01) | |

(52) U.S. Cl.
CPC . *B62D 1/189* (2013.01); *B62D 3/02* (2013.01); *B62D 1/18* (2013.01); *B62D 1/183* (2013.01); *B62D 1/187* (2013.01); *B62D 1/184* (2013.01)
USPC ...................................... 180/443

(58) Field of Classification Search
CPC ........ B62D 1/187; B62D 1/184; B62D 1/183; B62D 1/195; B62D 1/189; B62D 1/18; B62D 5/0409; B62D 3/02
See application file for complete search history.

(56) References Cited

U.S. PATENT DOCUMENTS

| | | | |
|---|---|---|---|
| 6,345,842 | B1 | 2/2002 | Igarashi et al. |
| 2007/0137379 | A1 | 6/2007 | Sanji et al. |

FOREIGN PATENT DOCUMENTS

| | | |
|---|---|---|
| JP | A-9-95244 | 4/1997 |
| JP | A-2000-142426 | 5/2000 |

(Continued)

OTHER PUBLICATIONS

International Search Report issued in International Patent Application No. PCT/JP2011/053815 dated Apr. 26, 2011 (with translation).

(Continued)

*Primary Examiner* — Joseph M Rocca
*Assistant Examiner* — Marlon Arce
(74) *Attorney, Agent, or Firm* — Oliff PLC

(57) ABSTRACT

An electric power steering apparatus includes a steering column that is swung around a tilting spindle during tilt adjustment, a fixing bracket that supports the steering column through the tilting spindle, and an electric motor that is supported by the steering column and used as a steering auxiliary. The fixing bracket includes a pair of side plates facing each other with the steering shaft therebetween in a vehicle width direction and a connection member through which the pair of side plates are connected together. Either one of the pair of side plates is provided with a first restraining portion that restrains the steering column from rotating in a first rotation direction around the tilting spindle. The remaining one of the pair of side plates is provided with a second restraining portion that restrains the steering column from rotating in a second rotation direction opposite to the first rotation direction.

8 Claims, 4 Drawing Sheets

(56) References Cited

FOREIGN PATENT DOCUMENTS

| | | |
|---|---|---|
| JP | A-2003-118602 | 4/2003 |
| JP | A-2004-136870 | 5/2004 |
| JP | A-2006-56430 | 3/2006 |
| JP | A-2009-40221 | 2/2009 |
| JP | B2-4352314 | 8/2009 |
| WO | WO 2005/030557 A1 | 4/2005 |

OTHER PUBLICATIONS

International Preliminary Report on Patentability issued in International Patent Application No. PCT/JP2011/053815 dated Sep. 11, 2012 (with translation).

ELECTRIC POWER STEERING APPARATUS

TECHNICAL FIELD

The present invention relates to an electric power steering apparatus.

BACKGROUND ART

A proposal has been made to provide a tilt steering apparatus that supports a lower part of a steering column swingably on a tilt central axis (see Patent Document 1, for example).

In Patent Document 1, the steering column is supported by upper and lower fixing brackets fixed to a vehicle body. The lower fixing bracket supports a lower column bracket fixed to a lower part of the steering column so as to be swingable on the tilt central axis.

On the other hand, the upper fixing bracket supports an upper column bracket fixed to an upper part of the steering column so as to be slidable upwardly and downwardly during tilt adjustment. The position of the steering column that have undergone tilt adjustment is locked by tightening both side plates of the upper column bracket from outside toward each other between both side plates of the upper fixing bracket by operating a rotation lever.

PRIOR ART DOCUMENTS

Patent Documents

Patent Document 1: Japanese Published unexamined Patent Application No. 2004-136870

BRIEF SUMMARY OF THE INVENTION

Problems to be Solved by the Invention

If a steering column is in a state of being greatly swingable in a tilt direction when a tilt steering apparatus, such as that of Patent Document 1, is attached to a vehicle, the attaching operation will be performed while supporting the steering column, which is heavy, by operator's hand, and therefore, disadvantageously, excellent attachability or mountability cannot be achieved. Especially, in an electric power steering apparatus, a heavy electric motor is mounted therein, and therefore attachability (i.e., attaching operability) becomes even worse. On the other hand, energy saving has been necessitated in recent years, and, as a result, the steering apparatus has been required to be reduced in weight.

It is an object of the present invention to provide an electric power steering apparatus that can be easily attached to a vehicle and that is light in weight.

Means for Solving the Problems

To achieve the object, an aspect of the present invention provides an electric power steering apparatus (1) that includes a steering column (15) that rotatably supports a steering shaft and that is swung around a tilting spindle (27) during tilt adjustment, a fixing bracket (13) that supports the steering column through the tilting spindle, and an electric motor (19) that is supported by the steering column (3) and that is used as a steering auxiliary. The fixing bracket includes a pair of side plates (34, 35) facing each other with the steering shaft therebetween in a vehicle width direction (W1) and a connection member (36) through which the pair of side plates are connected together. Either one of the pair of side plates is provided with a first restraining portion (46) that restrains the steering column from rotating in a first rotation direction (Z1) around the tilting spindle. The remaining one of the pair of side plates is provided with a second restraining portion (49) that restrains the steering column from rotating in a second rotation direction (Z2) opposite to the first rotation direction.

Although the alphanumeric characters in parentheses respectively represent corresponding components in an embodiment described later, this does not mean that the present invention is limited to this embodiment, of course. The same applies to the following description in this specification item.

In the present aspect, the first restraining portion and the second restraining portion can restrain the fixing bracket and the steering column from relatively rotating in the tilt direction at an excessively large angle when the electric power steering apparatus is attached and mounted onto the vehicle body. Therefore, the attaching operation onto the vehicle body can be more easily performed. Additionally, the fixing bracket has a simple structure in which the pair of side plates are connected together by means of the connection member, thus making it possible to contribute to the weight reduction thereof.

Either one of the first restraining portion and the second restraining portion may be a hook engagement portion (46) that is capable of being hooked on from below and capable of being engaged with a first projection (47) extending from the steering column, and the remaining one thereof may be a contact portion (49) that is capable of coming into contact from above with a second projection (48) extending from the steering column.

In this case, the hook engagement portion that is either one of the first restraining portion and the second restraining portion is hooked on from below and is engaged with the first projection so as to support the load of the steering column when the fixing bracket is attached to the vehicle body in order to attach and mount the electric power steering apparatus onto the vehicle body, and therefore attachability to the vehicle body is made even easier.

The first restraining portion may be the hook engagement portion, and an inner surface (34a) of the side plate (34) having the hook engagement portion may be disposed near a side part of the electric motor, and, with respect to the vehicle width direction, a distance (L1) between the side plate (34) having the hook engagement portion and a central axis (C1) of the steering shaft may be longer than a distance (L2) between the side plate (35) having the contact portion and the central axis of the steering shaft.

In this case, in the fixing bracket, the side plate having the hook engagement portion chiefly receives the load of the electric motor that is comparatively heavy through the hook engagement portion, and therefore the electric power steering apparatus can be more easily attached to the vehicle body. Additionally, the distance between the side plate having the hook engagement portion and the steering shaft is set to be relatively long, and therefore the weight balance between the right and left sides is improved. As a result, the attachability of the electric power steering apparatus onto the vehicle body is made even higher. Additionally, the side plate having the hook engagement portion is disposed near the electric motor, and therefore this is a preferred arrangement from the viewpoint of receiving the reaction force of assistance by the electric motor.

The second restraining portion may be the contact portion, and an inner surface (35a) of the side plate (35) having the contact portion may support a controller (20) that controllably drives the electric motor.

In this case, the electric motor and the controller are disposed between the pair of side plates of the fixing bracket, and therefore the electric motor and the controller can be reliably protected when these components are transported or are attached to the vehicle. Additionally, the heat of the controller can be released to the vehicle body through the fixing bracket, and the heat-releasing effect is high. Additionally, the controller is fixed to the fixing bracket fixed to the vehicle body without being fixed to a steering column or to an electric motor in the same way as in the conventional technique. Therefore, the vibration of the controller becomes small, and, as a result, durability can be improved.

The pair of side plates may be provided with stiffening beads (51, 52), respectively, and the stiffening beads may include first parts (511, 521), respectively, that extend in a direction parallel to an axial direction of the steering shaft and second parts (512, 522), respectively, that extend from the first parts in an inclined manner, and each may have a bent shape.

In this case, the structural strength of the side plates of the fixing bracket can be secured by each stiffening bead having a bent shape, and, as a result, the steering column can be stably supported.

The electric power steering apparatus may further include a first fixing bracket serving as the fixing bracket and a second fixing bracket (14) that supports the steering column so that the steering column is positionally adjusted during tilt adjustment, and the second fixing bracket may be disposed apart from the first fixing bracket above the first fixing bracket in an axial direction of the steering shaft, and may be independent of the first fixing bracket.

In this case, the first fixing bracket and the second fixing bracket are disposed apart from each other, and are independent of each other, and therefore a huge weight reduction can be achieved in comparison with an example in which these components are formed integrally with each other.

The aforementioned or other objects, features, and effects of the present invention will be clarified by the following description of an embodiment with reference to the accompanying drawings.

EMBODIMENT FOR CARRYING OUT THE INVENTION

A preferred embodiment of the present invention will be described with reference to the accompanying drawings.

Figure 1:
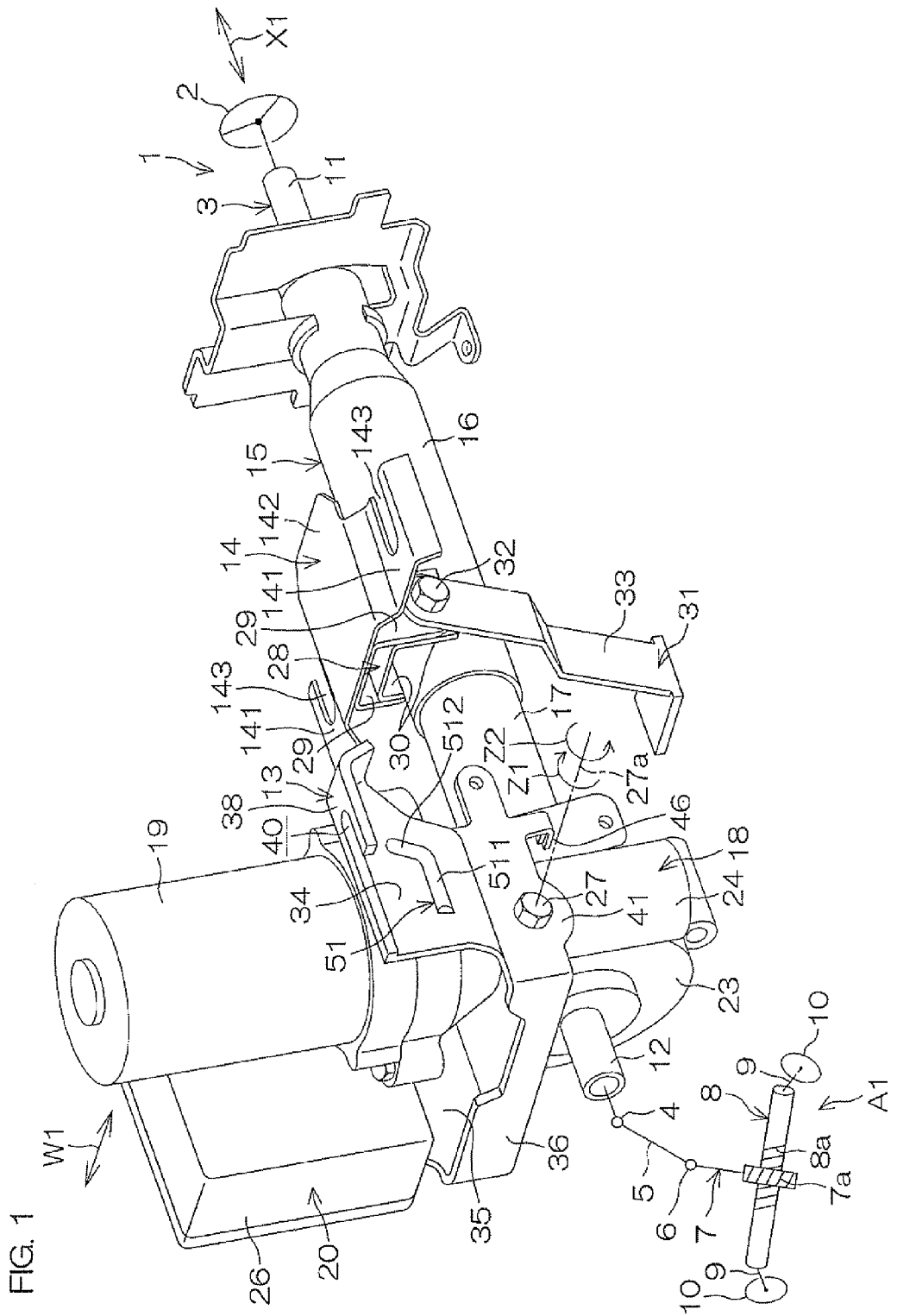
FIG. 1 is a schematic perspective view of an electric power steering apparatus according to an embodiment of the present invention.

FIG. 1 is a schematic perspective view of an electric power steering apparatus according to an embodiment of the present invention. As shown in FIG. 1, the electric power steering apparatus 1 is composed of a steering shaft 3 connected to a steering member 2, such as a steering wheel, an intermediate shaft 5 connected to the steering shaft 3 through a universal joint 4, a pinion shaft 7 connected to the intermediate shaft 5 through a universal joint 6, and a rack shaft 8 that serves as a steerable shaft and that has a rack 8a engaged with a pinion 7a disposed near an end of the pinion shaft 7.

A steerable mechanism A1 is arranged by a rack-and-pinion mechanism including the pinion shaft 7 and the rack shaft 8. The rack shaft 8 is supported movably in a vehicle width direction W1 by means of a housing (not shown) fixed to a vehicle body. Each end of the rack shaft 8 is connected to a corresponding steerable wheel 10 through a corresponding tie rod 9 and a corresponding knuckle arm (not shown).

The steering shaft 3 consists of a first shaft 11 and a second shaft 12 that are connected together through a torsion bar (not shown) so as to make torque transmission and so as to be relatively movable in an axial direction X1. The steering shaft 3 is rotatably supported through a bearing (not shown) by means of a steering column 15 fixed to a lower fixing bracket 13 serving as a first bracket and to an upper fixing bracket 14 serving as a second bracket. The lower fixing bracket 13 serving as a first bracket and the upper fixing bracket 14 serving as a second bracket are made of, for example, sheet metal, and are fixed to the vehicle body.

The steering column 15 is composed of an upper tube 16 and a lower tube 17 that are fitted to each other so as to be relatively movable in the axial direction and a housing 18 connected to a lower end of the lower tube 17 in the axial direction. An electric motor 19 serving as a steering auxiliary and a controller 20 (specifically, an ECU: Electronic Control Unit) that controls the operation of the electric motor 19 are arranged side by side in the vehicle width direction W1 above the housing 18.

Figure 2:
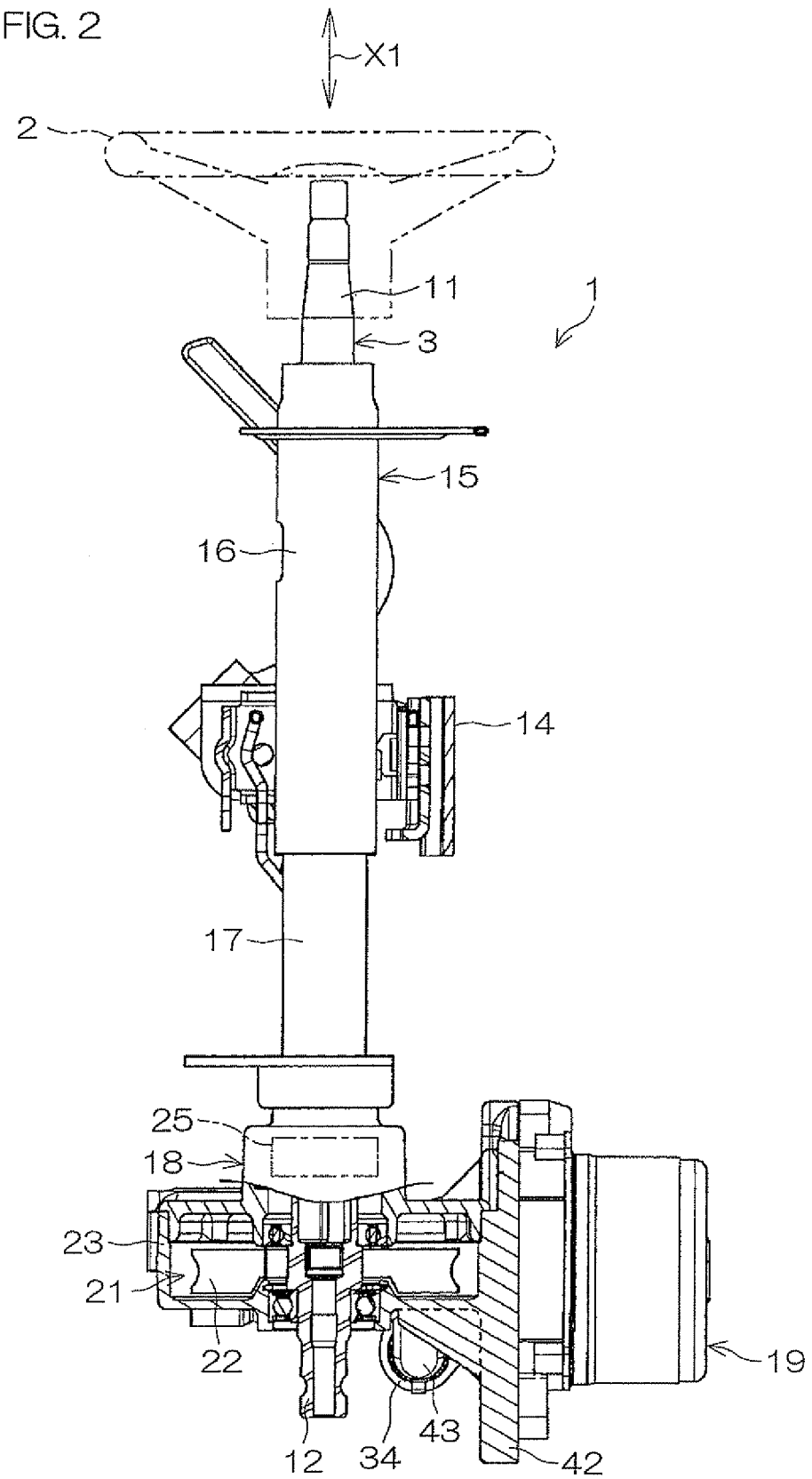
FIG. 2 is a partially cutaway side view of the electric power steering apparatus.

As shown in FIG. 2 that is a partially cutaway side view of the electric power steering apparatus 1, a reduction mechanism 21 that decelerates the power of the electric motor 19 and transmits this power to the second shaft 12 is housed in the housing 18. The reduction mechanism 21 includes a driving gear (not shown) disposed to be rotatable together with a rotational shaft of the electric motor 19 and a driven gear 22 that meshes with the driving gear and that is connected to the second shaft 12 so as to be rotatable together therewith. For example, a worm can be used as the driving gear, and, for example, a worm wheel can be used as the driven gear 22. The driving gear is housed in a driving-gear housing portion 23 disposed in the housing 18 as shown in FIG. 1, whereas the driven gear 22 is housed in a driven-gear housing portion 24 disposed in the housing 18 as shown in FIG. 2. A torque sensor 25 that detects a steering torque applied onto the steering shaft 3 is housed in the housing 18.

The controller 20 has its case 26 containing a power substrate and a control substrate (not shown). The controller 20 controllably drives the electric motor 19 based on a torque detection result obtained by the torque sensor and based on a vehicle speed detection result sent from a vehicle speed sensor (not shown).

Referring to FIG. 1, the electric power steering apparatus 1 is arranged as a tilt steering apparatus that has a tilt adjusting function. In detail, the lower fixing bracket 13 serving as a first fixing bracket that is fixed to the vehicle body supports the steering column 15 through a tilting spindle 27 consisting of a pivot shaft so as to be swingable around the tilting spindle 27.

The electric motor 19 and the controller 20 are disposed to be erected upwardly in a direction perpendicular to both the axial direction X1 of the steering shaft 3 and a central axis 27a of the tilting spindle 27.

On the other hand, the upper fixing bracket 14 serving as a second fixing bracket that is fixed to the vehicle body supports the upper column bracket 28 that is fixed to the steering column 15 and that has the shape of a downwardly-open groove so as to be slidable upwardly and downwardly during tilt adjustment (in more detail, upwardly and downwardly in a rotation direction centering the tilting spindle 27).

The upper fixing bracket 14 is composed of an upper plate 142 having a left-and-right pair of mounting seats 141 and a pair of side plates 29 included in a downwardly-open channel fixed to the lower surface of the upper plate 142. Each mounting seat 141 is provided with an attachment groove 143 that is open toward the rear of the vehicle. A fixing bolt (not shown) is inserted into the attachment groove 143 upwardly to the vehicle body. The fixing bolt is fixed to the vehicle body by inserting a so-called capsule to hold the mounting seat 141 onto the vehicle body by means of a predetermined holding force, which is not shown. The function of the capsule makes it possible to detach the fixing bolt from the attachment groove 143 when an impact is absorbed.

A tightening mechanism 31 that tightens and fixes the pair of side plates 30 of the upper column bracket 28 after the completion of tilt adjustment is disposed between the pair of side plates 29 of the upper fixing bracket 14 serving as a second fixing bracket. The tightening operation and the loosening operation of the tightening mechanism 31 are performed by rotating an operating lever 33 around a tightening shaft 32 that passes through both side plates 29 of the upper fixing bracket 14 and through both side plates 30 of the upper column bracket 28.

Figure 3:
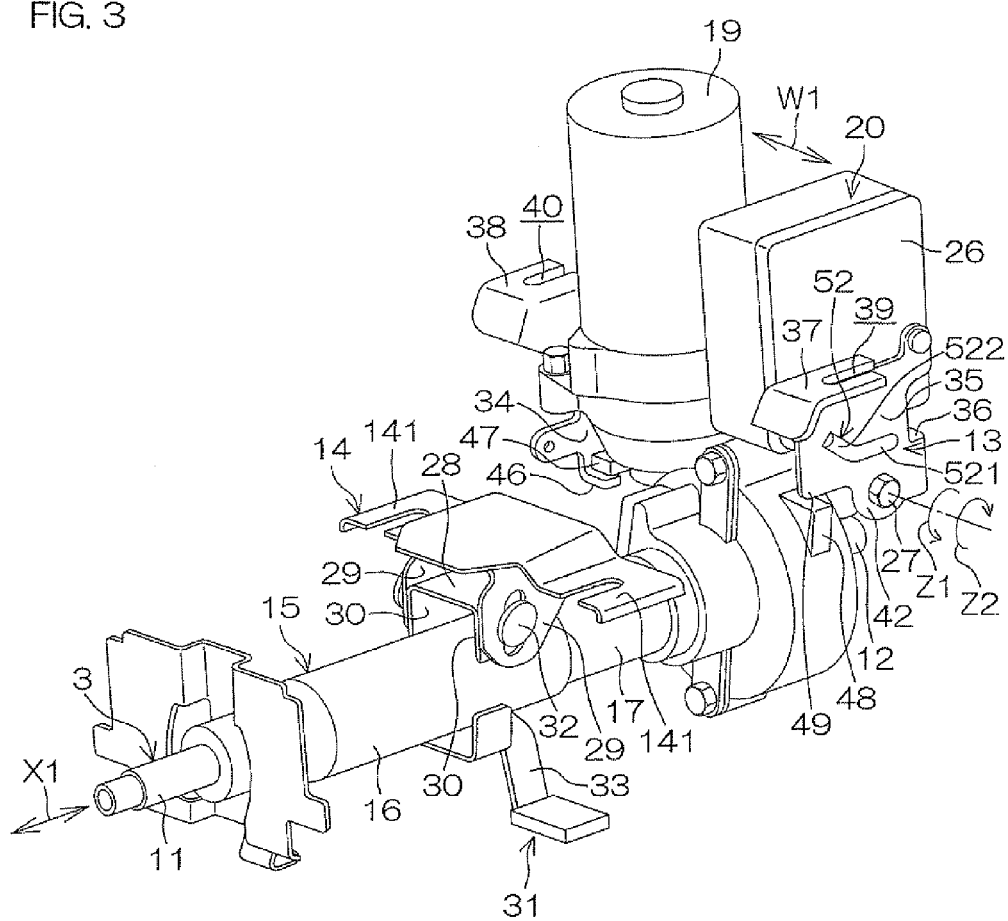
FIG. 3 is a perspective view of the electric power steering apparatus that is seen from another angle.
Figure 4:
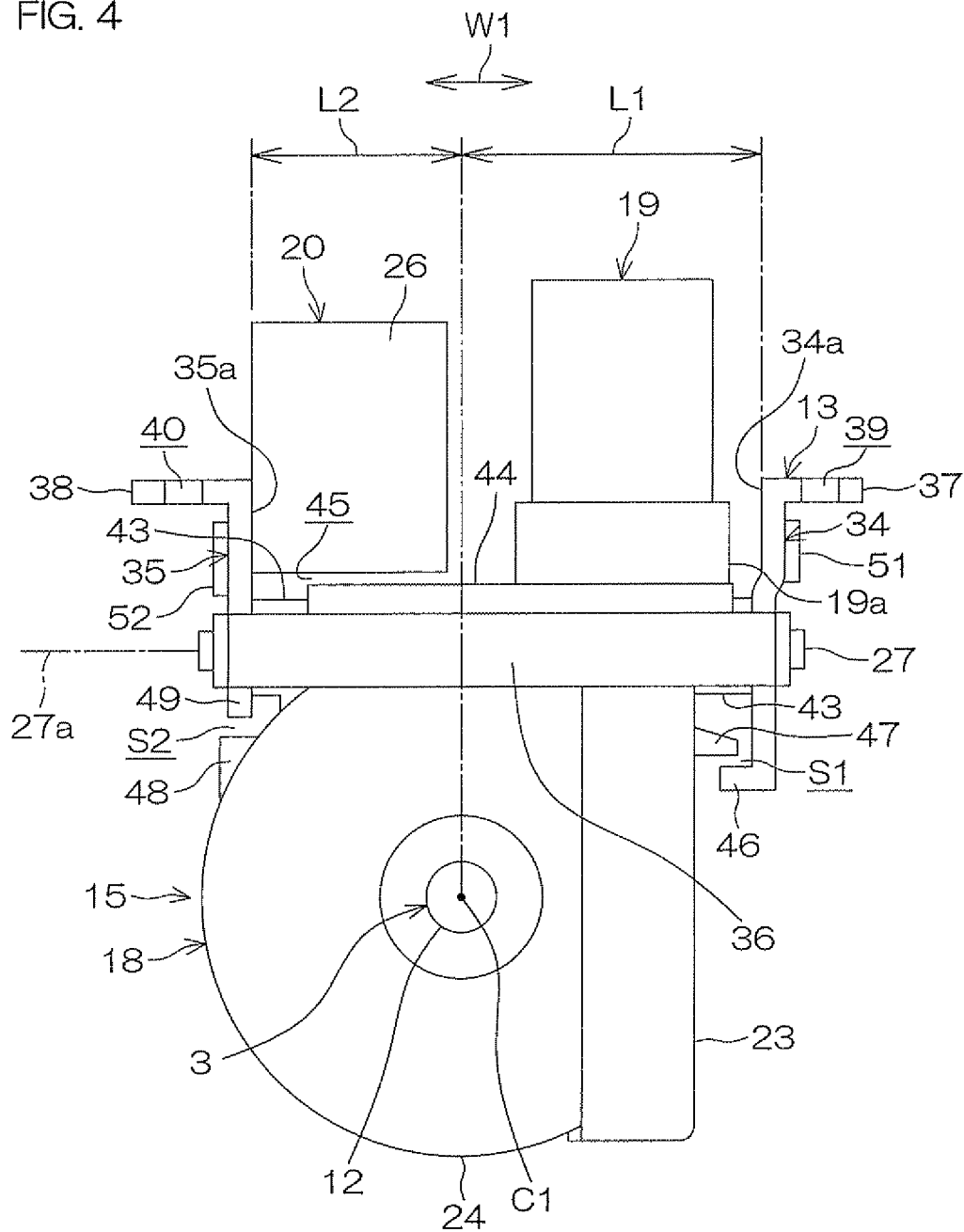
FIG. 4 is a schematic view of the electric power steering apparatus that is seen from below in an axial direction of a steering shaft.

The lower fixing bracket 13 serving as a first fixing bracket is composed of a pair of side plates 34 and 35 and a connection member 36 with reference to FIG. 1, FIG. 3 that is a perspective view of the electric power steering apparatus 1 seen from another angle, and FIG. 4 that is a bottom view of the electric power steering apparatus 1 with respect to the axial direction X1 of the steering shaft 3.

The pair of side plates 34 and 35 face each other with the steering shaft 3 therebetween, and, in more detail, face each other with the housing 18 of the steering column 15 in the vehicle width direction W1 therebetween. The connection member 36 horizontally extends and connects the pair of side plates 34 and 35 together above or below the second shaft 12 of the steering shaft 3 (in the present embodiment, above the second shaft 12 of the steering shaft 3 as shown in FIG. 1).

As shown in FIG. 1 and FIG. 3, the side plates 34 and 35 have, for example, stiffening beads 51 and 52, respectively, that are formed so as to swell outwardly and sidewardly. The stiffening bead 51 formed in the side plate 34 consists of a first part 511 extending in a direction parallel to the axial direction X1 of the steering shaft 3 and a second part 512 extending from the first part 511 in an inclined manner, and has a bent shape. Likewise, the stiffening bead 52 formed in the side plate 35 consists of a first part 521 extending in the direction parallel to the axial direction xi of the steering shaft 3 and a second part 522 extending from the first part 521 in an inclined manner, and has a bent shape.

Attachment plates 37 and 38 that are attached to the vehicle body extend outwardly and sidewardly from upper ends of the pair of side plates 34 and 35, respectively. As shown in FIG. 3, the attachment plates 37 and 38 have attachment grooves 39 and 40, respectively, that are open toward the front of the vehicle. The lower fixing bracket 13 is fixed to the vehicle body by means of a fixing bolt (not shown) that passes through each of the attachment grooves 39 and 40. For example, the attachment grooves 39 and 40 enable the fixing bolt fixed at the vehicle-body side to be introduced in a direction perpendicular to the axis of the fixing bolt, thus improving the attachability of the electric power steering apparatus 1 to the vehicle body.

As shown in FIG. 1 and FIG. 3, the tilting spindle 27 is inserted into lower parts 41 and 42 of the side plates 34 and 35. The lower parts 41 and 42 of the side plates 34 and 35 have through-holes (not shown), respectively, through which the tilting spindle 27 is inserted. The tilting spindle 27 inserted therethrough is inserted into through-holes (not shown) of a tilting-spindle connection portion 43 disposed at the housing 18 as shown in FIG. 4. As a result, the housing 18 is supported by the lower fixing bracket 13 swingably around the tilting spindle 27.

As shown in FIG. 4, one side plate 34 is disposed close to a side part 19a of the electric motor 19, whereas the other side plate 35 is disposed along the case 26 of the controller 20. With respect to the vehicle width direction W1, the distance L1 between the one side plate 34 and the central axis C1 of the steering shaft 3 is set to be longer than the distance L2 between the other side plate 35 and the central axis C1 of the steering shaft 3 (L1>L2).

The electric motor 19 is fixed to a base 44 formed at the upper part of the housing 18. On the other hand, the case 26 of the controller 20 is fixed to an inner surface 35a of the other side plate 35. A gap 45 is created between the case 26 and the base 44.

A hook engagement portion 46 serving as a first restraining portion is disposed so as to extend toward the other side plate 35 from the lower end of the one side plate 34 near the electric motor 19 in angle shape (i.e., in hook shape). The hook engagement portion 46 faces a first projection 47 extending from the driving-gear housing portion 23 of the housing 18 with a predetermined gap S1 between the hook engagement portion 46 and the first projection 47.

The hook engagement portion 46 serving as a first restraining portion can be hooked on and be engaged with the first projection 47 from below when the electric power steering apparatus 1 is attached and mounted onto the vehicle. The hook engagement portion 46 is hooked on and is engaged with the first projection 47, and, as a result, the steering column 15 is restrained from rotating in a first rotation direction Z1 (see FIG. 3) around the tilting spindle 27.

On the other hand, a contact portion 49 serving as a second restraining portion that can come from above into contact with a second projection 48 extending from the driven-gear housing portion 24 of the housing 18 is disposed at the lower end of the side plate 35 to which the controller 20 is fixed. When the electric power steering apparatus 1 is attached and mounted onto the vehicle, the contact portion 49 serving as a second restraining portion comes into contact with the second projection 48 from above, and, as a result, the steering column 15 is restrained from rotating around the tilting spindle 27 in a second rotation direction Z2 (see FIG. 3) opposite to the first rotation direction Z1.

The swinging range of the steering column 15 around the tilting spindle 27 that is restrained by the hook engagement portion 46 serving as a first restraining portion and by the contact portion 49 serving as a second restraining portion when the electric power steering apparatus 1 is attached and mounted onto the vehicle is set to be greater than the swinging range of the steering column 15 by tilt adjustment after the electric power steering apparatus 1 is attached and mounted onto the vehicle. Therefore, the hook engagement portion 46 and the contact portion 49 never hinder tilt adjustment after the electric power steering apparatus 1 is attached and mounted onto the vehicle body.

In the present embodiment, it becomes easy to perform an attaching operation onto the vehicle. Specifically, the attaching operation of the electric power steering apparatus 1 is performed as follows. First, the upper end of the intermediate shaft 5 whose lower end is connected to the pinion shaft 7 of the steerable mechanism A1 is passed through a dash panel (not shown), and is located in the vehicle interior. Thereafter, the steering column 15 supporting the steering shaft 3 is attached to the vehicle body, and then the lower end of the steering shaft 3 is inserted into the universal joint 4 disposed at the upper end of the intermediate shaft 5, and is tightened and fixed by a bolt (not shown).

To attach the steering column 15 to the vehicle body, the lower fixing bracket 13 is first attached in such a way as to insert a bolt temporarily joined to the vehicle body from the open side of the attachment grooves 39 and 40 of the lower fixing bracket 13. In this operation, the swinging range of the lower fixing bracket 13 around the tilting spindle 27 is restrained by the hook engagement portion 46 serving as a first restraining portion and by the contact portion 49 serving as a second restraining portion in a state in which the steering column 15 is supported by operator's hand. Therefore, the lower fixing bracket 13 can be positionally adjusted and be easily attached to an attachment portion on the vehicle body side, and excellent attachability can be obtained.

Additionally, in a state in which the lower fixing bracket 13 has been attached and mounted on the vehicle body as described above, the load of the steering column 15 can be supported by allowing the hook engagement portion 46 serving as a first restraining portion to be hooked on and be engaged with the first projection 47 of the housing 18 of the steering column 15. Therefore, the attaching operation is greatly improved when the upper fixing bracket 14 is attached to the vehicle body at the next process step.

Additionally, the lower fixing bracket 13 serving as a first fixing bracket has a simple structure in which the pair of side plates 34 and 35 are connected together by means of the connection member 36, thus making it possible to contribute to the weight reduction of the electric power steering apparatus 1.

Additionally, the inner surface 34a of the side plate 34 having the hook engagement portion 46 is disposed near the side part 19a of the electric motor 19, and, with respect to the vehicle width direction W1, the distance L1 between the side plate 34 having the hook engagement portion 46 and the central axis C1 of the steering shaft 3 is longer than the distance L2 between the side plate 35 having the contact portion 49 and the central axis C1 of the steering shaft 3, and therefore the following advantages can be obtained.

In detail, in the lower fixing bracket 13, the side plate 34 having the hook engagement portion 46 chiefly receives the load of the electric motor 19 that is comparatively heavy through the hook engagement portion 46, and therefore the electric power steering apparatus 1 can be more easily attached to the vehicle body. Additionally, the distance L1 between the side plate 34 having the hook engagement portion 46 and the central axis C1 of the steering shaft 3 is set to be relatively long, and therefore the weight balance between the right and left sides is improved, and, as a result, the attachability of the electric power steering apparatus 1 onto the vehicle body is made even higher. Additionally, the side plate 34 having the hook engagement portion 46 is disposed near the electric motor 19, and therefore this is a preferred arrangement from the viewpoint of receiving the reaction force of assistance by the electric motor 19.

Additionally, the inner surface 35a of the side plate 35 having the contact portion 49 supports the controller 20 that controllably drives the electric motor 19, and therefore the electric motor 19 and the controller 20 are disposed between the pair of side plates 34 and 35 of the lower fixing bracket 13, and the electric motor 19 and the controller 20 can be reliably protected by both of the side plates 34 and 35 when these components are transported or are attached to the vehicle. Additionally, the heat of the controller 20 can be released to the vehicle body through the lower fixing bracket 13, and the heat releasing effect is high. Additionally, the controller 20 is fixed to the lower bracket 13 fixed to the vehicle body without being fixed to a steering column or to an electric motor in the same way as in the conventional technique, and therefore the vibration of the controller 20 becomes small, and, as a result, durability can be improved.

Additionally, the side plates 34 and 35 are provided with the stiffening beads 51 and 52, respectively, and the stiffening beads 51 and 52 have the first parts 511 and 521 extending in the direction parallel to the axial direction X1 of the steering shaft 3 and the second parts 512 and 522 extending from the first parts 511 and 512, respectively, in an inclined manner, and each have a bent shape, and therefore, for example, the structural strength of the side plates 34 and 35 made of sheet metal can be secured, and, as a result, the steering column 15 can be stably supported.

Additionally, the lower fixing bracket 13 and the upper fixing bracket 14 are disposed apart from each other, and are independent of each other, and therefore a huge weight reduction can be achieved in comparison with an example in which these components are formed integrally with each other.

The present invention is not limited to the above-mentioned embodiment, and, for example, the connection member 36 of the lower fixing bracket 13 may horizontally extend below the steering shaft 3 so as to connect the pair of side plates 34 and 35 together. Additionally, it is permissible to provide a connection member horizontally extending above the steering shaft 3 and a connection member horizontally extending below the steering shaft. Additionally, in the stiffening beads 51 and 52, the second parts 512 and 522 may be removed.

Although the present invention has been described according to the detailed embodiment as above, persons skilled in the art that have understood the above contents will easily think of its alternatives, modifications, and equivalents. Therefore, the present invention should be regarded as falling within the scope of the appended claims and the scope of its equivalents.

The present application corresponds to Japanese Patent Application No. 2010-44166 filed in the Japan Patent Office on Mar. 1, 2010, and the entire disclosure of the application is incorporated herein by reference.

DESCRIPTION OF SIGNS

1 . . . Electric power steering apparatus, 2 . . . Steering member, 3 . . . Steering shaft, 5 . . . Intermediate shaft, 7 . . . Pinion shaft, 8 . . . Rack shaft, 10 . . . Steerable wheel, 11 . . . First shaft, 12 . . . Second shaft, 13 . . . Lower fixing bracket (First fixing bracket), 14 . . . Upper fixing bracket (Second fixing bracket), 15 . . . Steering column, 16 . . . Upper tube, 17 . . . Lower tube, 18 . . . Housing, 19 . . . Electric motor, 20 . . . Controller, 21 . . . Reduction mechanism, 26 . . . Case (of controller), 27 . . . Tilting spindle, 27a . . . Central axis (of tilting spindle), 28 . . . Upper column bracket, 34, 35 . . . Side plate, 34a, 35a . . . Inner surface, 36 . . . Connection member, 44 . . . Base, 46 . . . Hook engagement portion (First restraining portion), 47 . . . First projection, 48 . . . Second projection, 49 . . . Contact portion (Second restraining portion), 51, 52 . . . Stiffening bead, 511, 521 . . . First part, 512, 522 . . . Second part, A1 . . . Steerable mechanism, C1 . . . Central axis (of steering shaft), L1 . . . Distance (between the side plate having the hook engagement portion and the central axis of the steering shaft), L2 . . . Distance (between the side plate having the contact portion and the central axis of the steering shaft), W1 . . . Vehicle width direction, X1 . . . Axial direction (of steering shaft), Z1 . . . First rotation direction (around tilting spindle), Z2 . . . Second rotation direction (around tilting spindle)

The invention claimed is:

1. An electric power steering apparatus comprising:
a steering column that rotatably supports a steering shaft and that is swung around a tilting spindle during tilt adjustment;
an electric motor that is supported by the steering column and that is used as a steering auxiliary; and
a fixing bracket that supports the steering column through the tilting spindle;
wherein the fixing bracket includes a pair of side plates facing each other with the steering shaft therebetween in a vehicle width direction and a connection member through which the pair of side plates are connected together,
either one of the pair of side plates is provided with a first restraining portion that restrains the steering column from rotating in a first rotation direction around the tilting spindle,
a remaining one of the pair of side plates is provided with a second restraining portion that restrains the steering column from rotating in a second rotation direction opposite to the first rotation direction,
the first restraining portion is a hook engagement portion that is capable of being hooked on from below and capable of being engaged with a first projection extending from the steering column,
the second restraining portion is a contact portion that is capable of coming into contact from above with a second projection extending from the steering column,
an inner surface of the side plate with the hook engagement portion is disposed near a side part of the electric motor, and
with respect to the vehicle width direction, a distance between the side plate having the hook engagement portion and a central axis of the steering shaft is longer than a distance between the side plate having the contact portion and the central axis of the steering shaft.

2. The electric power steering apparatus according to claim 1, wherein the second restraining portion is the contact portion, and
an inner surface of the side plate having the contact portion supports a controller that controllably drives the electric motor.

3. The electric power steering apparatus according to claim 1, wherein each of the pair of side plates is provided with a stiffening bead, and
the stiffening bead includes a first part extending in a direction parallel to an axial direction of the steering shaft and a second part extending from the first part in an inclined manner, and has a bent shape.

4. The electric power steering apparatus according to claim 1, further comprising:
a first fixing bracket serving as the fixing bracket; and
a second fixing bracket that supports the steering column so that the steering column is positionally adjusted during tilt adjustment;
wherein the second fixing bracket is disposed apart from the first fixing bracket above the first fixing bracket in an axial direction of the steering shaft, and is independent of the first fixing bracket.

5. The electric power steering apparatus according to claim 2, wherein each of the pair of side plates is provided with a stiffening bead, and
the stiffening bead includes a first part extending in a direction parallel to an axial direction of the steering shaft and a second part extending from the first part in an inclined manner, and has a bent shape.

6. The electric power steering apparatus according to claim 2, further comprising:
a first fixing bracket serving as the fixing bracket; and
a second fixing bracket that supports the steering column so that the steering column is positionally adjusted during tilt adjustment;
wherein the second fixing bracket is disposed apart from the first fixing bracket above the first fixing bracket in an axial direction of the steering shaft, and is independent of the first fixing bracket.

7. The electric power steering apparatus according to claim 3, further comprising:
a first fixing bracket serving as the fixing bracket; and
a second fixing bracket that supports the steering column so that the steering column is positionally adjusted during tilt adjustment;
wherein the second fixing bracket is disposed apart from the first fixing bracket above the first fixing bracket in an axial direction of the steering shaft, and is independent of the first fixing bracket.

8. The electric power steering apparatus according to claim 5, further comprising:
a first fixing bracket serving as the fixing bracket; and
a second fixing bracket that supports the steering column so that the steering column is positionally adjusted during tilt adjustment;
wherein the second fixing bracket is disposed apart from the first fixing bracket above the first fixing bracket in an axial direction of the steering shaft, and is independent of the first fixing bracket.

* * * * *